United States Patent

Weaving

[15] 3,703,164
[45] Nov. 21, 1972

[54] ATMOSPHERIC POLLUTION CONTROL ARRANGEMENT FOR INTERNAL COMBUSTION ENGINE

[72] Inventor: John Harold Weaving, Coventry, England

[73] Assignee: British Leyland Motor Corporation Limited, London, England

[22] Filed: Feb. 19, 1971

[21] Appl. No.: 116,828

[30] Foreign Application Priority Data

Feb. 19, 1970 Great Britain............7,907/70

[52] U.S. Cl..............123/119 A, 123/75 B, 123/75 C
[51] Int. Cl.........................F02m 25/06, F02b 47/08
[58] Field of Search...................123/19 A, 75 B, 75 C

[56] References Cited

UNITED STATES PATENTS

| | | | |
|---|---|---|---|
| 1,384,133 | 7/1921 | Howe | 123/119 A |
| 1,833,802 | 11/1981 | Violet | 123/75 C |
| 1,952,881 | 3/1934 | Minter | 123/75 B |
| 2,701,556 | 2/1955 | Woerner | 123/119 A |
| 3,583,375 | 6/1971 | Pischinger | 123/119 A |

*Primary Examiner*—Wendell E. Burns
*Attorney*—Mawhinney & Mawhinney

[57] ABSTRACT

An internal combustion engine having a valve in addition to normal inlet and exhaust valves in the cylinders of the engine through which part of the gaseous products of combustion are removable, before they have passed through the exhaust system of the engine, and by which the gaseous products of combustion extracted through the additional valves are re-introduced into each cylinder of the engine after closure of the inlet valve thereof. By recirculating part of the exhaust gases from the cylinders in this way, the proportion of oxides of nitrogen in the final exhaust gases from the engine is reduced.

10 Claims, 6 Drawing Figures

INVENTOR
JOHN HAROLD WEAVING

ATMOSPHERIC POLLUTION CONTROL ARRANGEMENT FOR INTERNAL COMBUSTION ENGINE

The invention relates to the exhaust gas emissions from internal combustion engines and in particular to the emission of oxides of nitrogen.

Due to the high temperature of combustion in the combustion chambers of internal combustion engines, both of the spark ignition and compression ignition types, oxides of nitrogen (principally nitric oxide) are formed by the combustion of nitrogen and oxygen from the air. Oxides of nitrogen are poisonous and the reduction of them in exhaust gases from internal combustion engines is the subject of legislation or proposed legislation in several countries.

It is well-known that the proportion of oxides of nitrogen may be considerably reduced by the recirculation of a proportion of the exhaust gases into the engine via the inlet manifold, through which air or air and fuel are normally induced, in the cases of compression ignition and spark ignition engines respectively. This method of introducing exhaust gas causes a reduction in power and usually a deterioration in fuel consumption. It may also contaminate the carburetor in a spark ignition engine. An object of this invention to reduce the proportions of oxides of nitrogen in exhaust gas coupled with the mitigation or elimination of these deleterious effects.

According to the invention, an internal combustion engine comprising at least one cylinder having inlet and exhaust valve means, also includes additional valve means through which part of the gaseous products of combustion are removable, before they have passed through the exhaust system of the engine, and means for re-introducing the gaseous products of combustion extracted through the additional valve means into a cylinder of the engine after closure of the inlet valve means thereof.

By re-introducing part of the gaseous products of combustion into a cylinder of the engine after the inlet valve of the relevant cylinder has closed, the full inlet charge of air or air and fuel is maintained, whereas in known arrangements for re-introducing exhaust gases into the cylinder, at least part of the inlet charge has been displaced by the recirculated gases, thereby affecting engine performance.

In one arrangement in accordance with the invention, said cylinder includes said additional valve means, the latter being arranged to be opened during part of the time the exhaust valve means of the cylinder is open, whereby part of the gaseous products of combustion will be removed from the cylinder for re-introduction into the cylinder instead of passing through the exhaust system of the engine.

Conveniently said cylinder is associated with a receiver chamber for the part of the gaseous products of combustion removed through the additional valve means, the latter also controlling the introduction of said part of the gaseous products into and out of said receiver chamber. Said receiver chamber may conveniently be formed in the head of the cylinder.

In an alternative arrangement, in accordance with the invention, for a single-cylinder engine, the additional valve means is a non-return valve in a branch duct leading from the exhaust system of the engine downstream of the exhaust valve means of the cylinder to the cylinder, the non-return valve permitting flow only in the direction from the exhaust system to the cylinder, and the branch duct includes a compressor for increasing the pressure of the exhaust gases diverted through the branch duct.

Where the engine has at least two cylinders, the additional valve means conveniently comprises a branch duct common to all cylinders of the engine and leading from the exhaust system of the engine downstream of the exhaust valve means in the cylinders and a distributing valve connected to the downstream end of the branch duct and arranged to discharge diverted exhaust gases into each cylinder through a non-return valve, permitting flow only in the direction from the exhaust system to the cylinder, to each cylinder in turn in timed relationship to the opening and closing of the inlet valve means of that cylinder, the branch duct including a compressor for increasing the pressure of the exhaust gases diverted through the branch duct.

Alternatively a multi-cylinder pump having the same number of cylinders as the engine, each pump cylinder being connected to supply compressed exhaust gas to a corresponding cylinder of the engine, may be employed instead of the distributing valve and a compressor common to all the cylinders of the engine.

Conveniently in any of the foregoing arrangements, where the additional valve means is provided in a cylinder, it may comprise a poppet valve arranged to be opened and closed by a cam-shaft. Where the inlet and exhaust valves of the cylinder or cylinders are also poppet valves operable by a cam-shaft or cam-shafts, a cam-shaft for controlling the opening and closing of inlet and/or exhaust valves may also be employed as or be interconnected with the cam-shaft for the additional poppet valve or valves.

Examples of several internal combustion engines in accordance with this invention are now described with reference to the accompanying drawings, in which.

Figure 1:
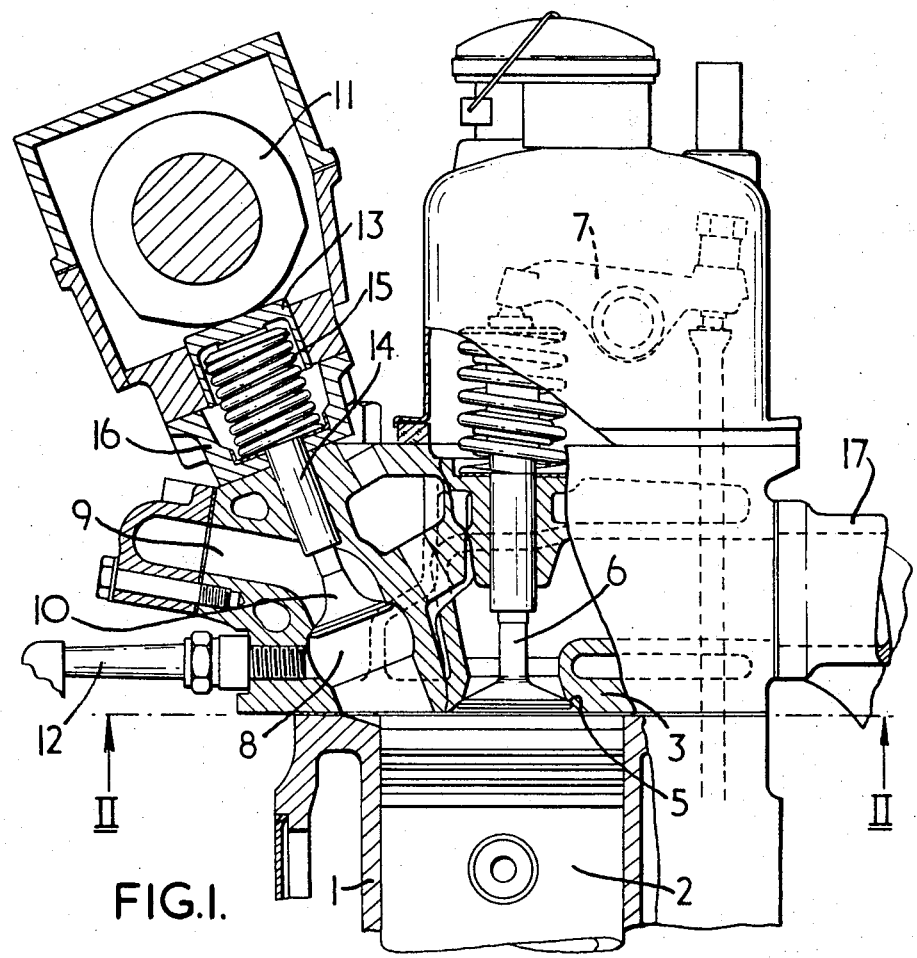
FIG. 1 is a part end elevation of a cylinder block and part-axial section through the head portion of a cylinder thereof of a first engine.
Figure 2:
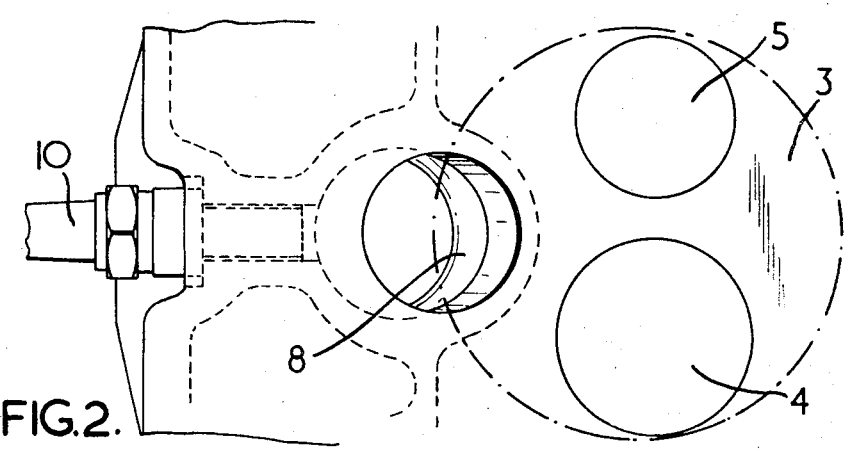
FIG. 2 is a diagrammatic view of the cylinder head on the line II—II in FIG. 1.
Figure 3:
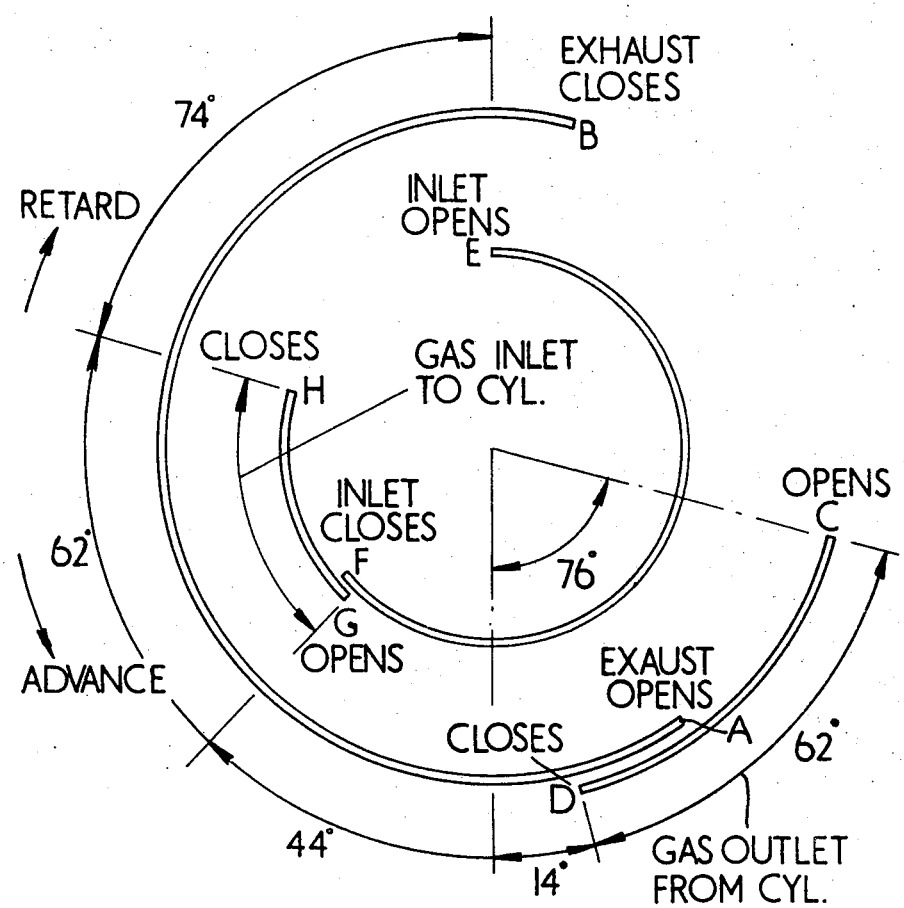
FIG. 3 is a typical timing diagram for a cylinder of the engine shown in FIGS. 1 and 2.

The first internal combustion engine with which this invention is concerned is shown in FIGS. 1 and 2 and comprises one or more cylinders 1 each containing a piston 2 and having a head 3 defining seats 4, 5 for inlet and exhaust poppet valves of which one (the exhaust valve) is shown at 6 in FIG. 1. The valves are opened and closed in known manner by an engine-driven camshaft (not shown) through rocker arms of which one is shown at 7. The head 3 of each cylinder defines a combustion space 8 provided with a spark plug 12 and leading to a closed receiver chamber 9 via a third poppet valve 10 arranged to be opened and closed to admit gases into and out of the receiver chamber 9. The third poppet valve 10 is the aforesaid additional valve means. The third poppet valve is opened by a further cam-shaft 11 engaging a cap 13 carried by the end of the shaft 14 of the valve 10 and is closed by means of a spring 15 acting between the cap 13 and a fixed valve housing 16. The cam-shaft 11 is driven in timed relation to the main cam-shaft for opening and closing the inlet and exhaust valves. The opening and closing of the third valve 10 is so timed that it will open to the interior of the combustion space 8 and hence to the cylinder 1 for a short period commencing shortly before the opening of the exhaust valve 6 and ending before the exhaust valve 6 has closed, thereby to allow a part of the gaseous products of combustion in the cylinder to be discharged into the receiver chamber 9 instead of passing through the exhaust valve 6 to the exhaust system 17 of the engine. The third valve 10 is arranged to be closed before the exhaust valve 6 so that after the third valve 10 has closed the remainder of the gases exhausted from the cylinder 1 will pass to the exhaust system 17. The third valve 10 is arranged to be closed before the pressure in the cylinder 1 has dropped to atmospheric pressure, preferably when the pressure is between one and two atmospheres above atmospheric pressure. The third valve 10 is re-opened shortly before the inlet valve has closed the port 4 to permit the gaseous products of combustion in the receiver chamber 9 to be re-introduced into the cylinder. The third valve 10 is closed approximately 60° after the inlet valve has closed. In this way part of the gaseous products of combustion are re-introduced into the cylinder 1 without a reduction in the inlet charge. FIG. 3 is a typical timing diagram in which the annular positions at which the exhaust valve 6 opens and closes are indicated at A and B, the positions of opening and closing of the third valve 10 in timed relation to the opening and closing of the exhaust valve 6 are indicated at C and D. As will be seen, the opening at C of the third valve 10 occurs before the opening at A of the exhaust valve 6. The third valve 10 closes at D shortly after the exhaust valve 6 opens. Between positions C and A, the third valve 10 only is open, and during that time the gaseous products of combustion will flow only to the receiver chamber 9. During the time between positions A and D the gaseous products of combustion will flow partly through the third valve 10 to the receiver chamber 9 and partly to the exhaust system 17 of the engine. During the time between positions D and B, the third valve 10 is closed and therefore the whole of the gases leaving the cylinder 1 will flow through the exhaust system 17 of the engine. The positions of opening and closing of the inlet valve are indicated at E and F respectively and the positions of opening and closing of the third valve 10 are indicated at G and H respectively. As will be seen, for most of the period during which the third valve 10 is open the inlet valve is closed. The positions of opening and closing, indicated at A to H of the three valves are typical positions shown by way of example only. The configuration of the combustion space 8 and the receiver chamber 9 is that adopted in an experimental engine and may be of other form in a production engine.

Figure 4:
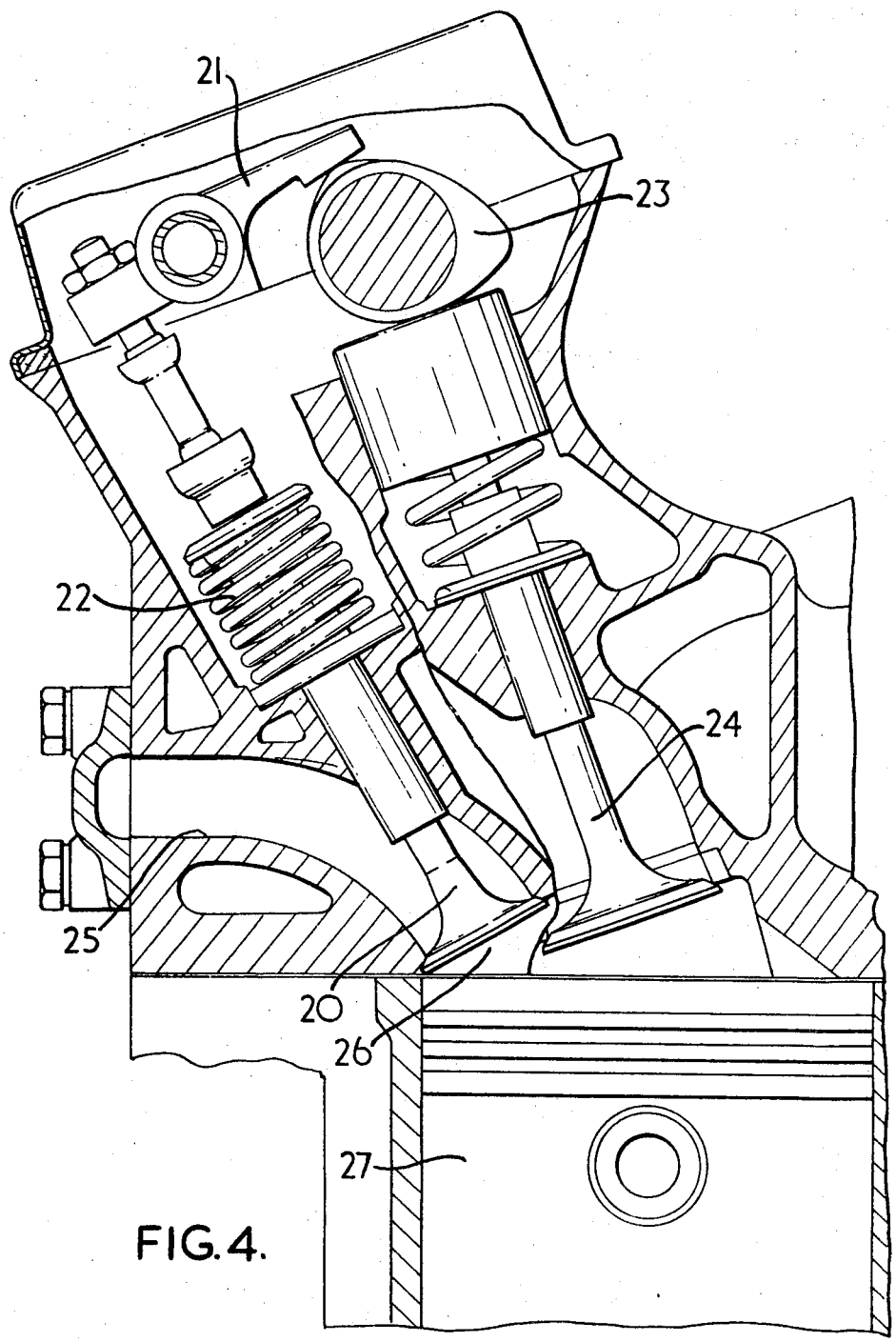
FIG. 4 is an axial section through a head portion of a cylinder of a second engine generally similar to that shown in FIGS. 1 and 2 but having an alternative valve mechanism.

FIG. 4 shows an alternative engine in which a third or additional poppet valve 20, similar to the valve 10 in FIG. 1, is arranged to be opened and closed by means of a rocker arm 21 and return spring 22 from the same cam-shaft 23 used to operate the inlet and exhaust valves of the engine. One of the latter valves is shown at 24. The receiver chamber, similar to 9 in FIG. 1, is shown at 25 and communicates with the combustion space 26 above the piston 27 when the valve 20 is open.

Figure 5:
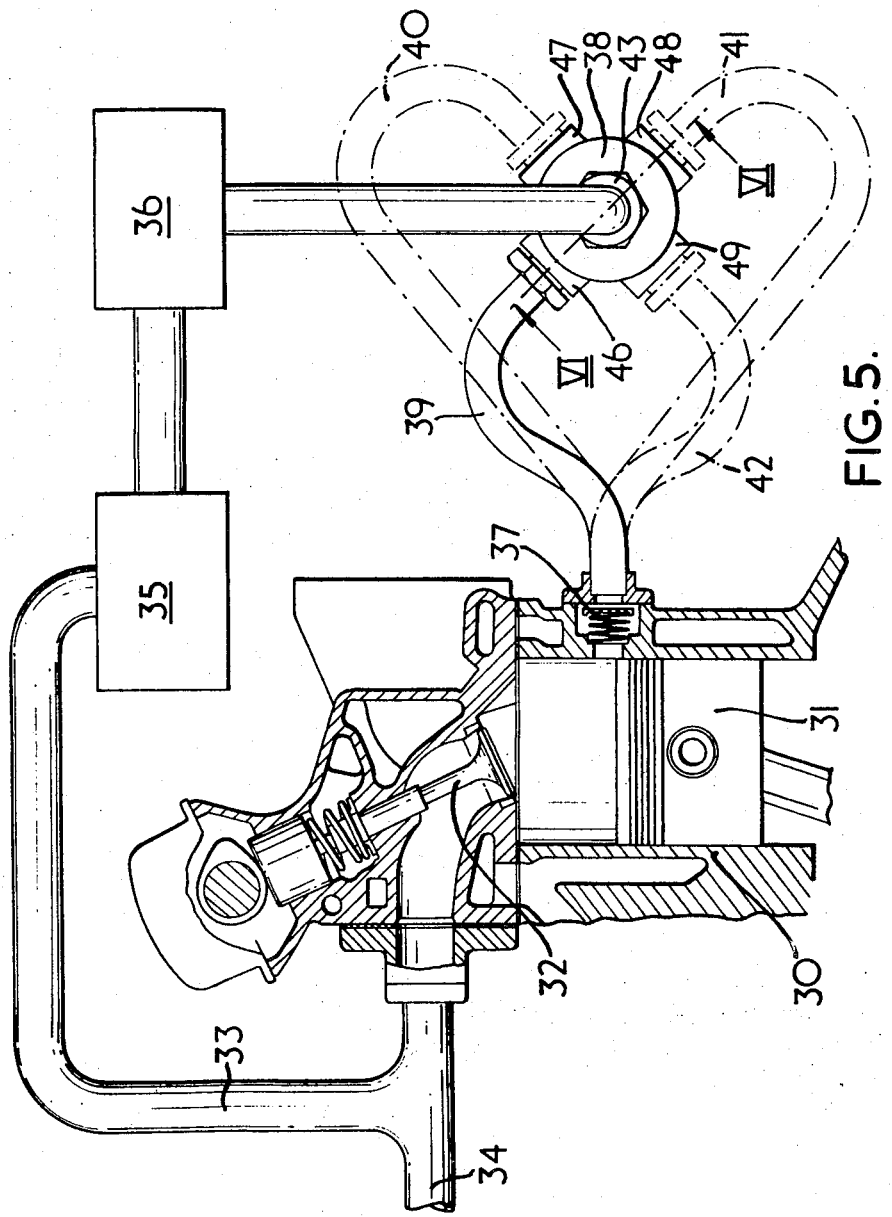
FIG. 5 is an axial section through a head portion of a cylinder of a third engine and showing diagrammatically a circuit for recirculating part of the exhaust gases discharged from the cylinder.
Figure 6:
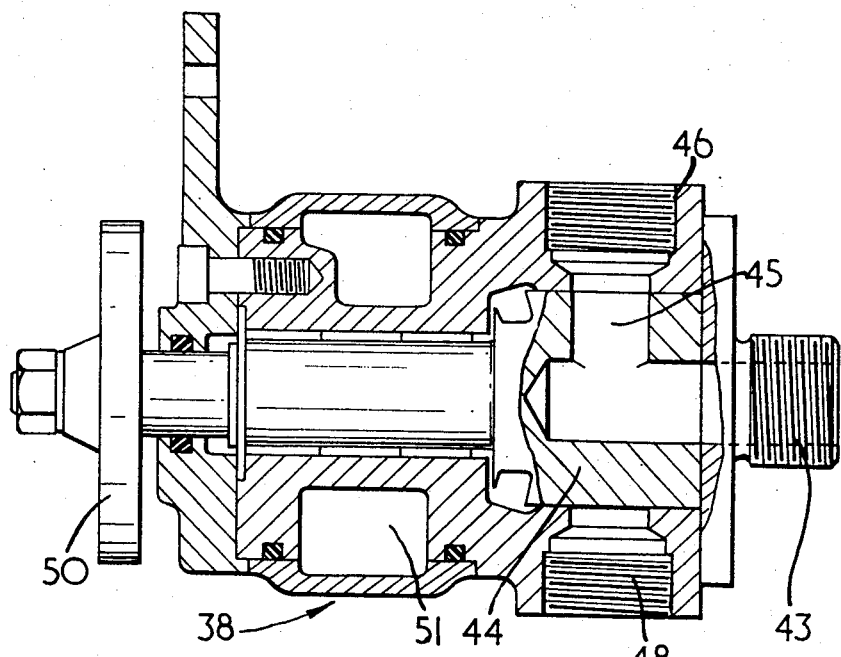
FIG. 6 is an axial section on the line VI—VI in FIG. 5 to an enlarged scale of a distributing valve shown in FIG. 5.

In a further engine in accordance with the invention, shown in FIG. 5, the or each cylinder 30 containing a piston 31 has normal inlet and exhaust valves of which the latter is shown at 32; but instead of the third or additional valve 10 of FIG. 1 or 20 of FIG. 4, there is a branch duct 33 leading from the exhaust system 34 common to all cylinders of the engine downstream of the exhaust valve 32 of the or each cylinder. The branch duct 33 leads to a compressor 35 which then compresses the diverted exhaust gases to a pressure above that which prevails in each cylinder shortly after the closure of the inlet valve thereof say at a pressure of two atmospheres above atmospheric pressure. From the compressor 35, the diverted exhaust gases are passed through a cooler 36 and re-introduced into the or each cylinder through a non-return valve 37 at the time the inlet valve of the cylinder has closed or shortly after it has closed. In this way the diverted exhaust gases are re-introduced to the cylinder without affecting the inlet charge. The non-return valve 37 or valves constitute the aforesaid additional valve means. In the case of a multi-cylinder engine there is a distributing valve 38 driven by the engine downstream of the compressor 35 and cooler 36. The distributing valve 38 is so timed that it will feed the exhaust gas diverted through the compressor into each cylinder through the appropriate one of pipes 39 to 42, there being one pipe for each cylinder, in turn at the point in the cycle thereof at or just after the closure of its inlet valve. In FIGS. 5 and 6, the distributing valve 38 is a rotary valve having a common inlet 43 leading from the compressor 35 and cooler 36. The valve 38 has a rotatable valve member 44 (see FIG. 6) having a throughway 45 which communicates in turn with outlet ports 46 to 49 communicating with the corresponding pipes 39 to 42 leading to the respective cylinders through the corresponding non-return valve 37. The valve member is turned by the disc 50 and is cooled by water circulated through passages 51. When the valve member 44 is in the position illustrated, the diverted and compressed exhaust gases are admitted to cylinder 30 through the non-return valve 37 of cylinder 30, which opens, the non-return valves similar to 37 of the remaining cylinders being held closed by the internal pressure in those cylinders. When the valve member 44 is turned to another position, the non-return valve 37 of the appropriate cylinder will open, the non-return valve 37 of the other cylinders being closed.

Instead of a common compressor 35 and the rotary valve 38, a multi-cylinder pump having the same number of cylinders as the engine may be used, each feeding the diverted exhaust gas to its respective cylinder. The pump will be driven at half engine speed. In a four-stroke engine this would be at cam-shaft speed. Alternatively a pump having half the number of cylinders as the engine may be driven at engine speed. The exhaust gases would be supplied by the pump through a valve to the appropriate cylinder.

Instead of the rotary distributing valve 38 being connected to the interior of each cylinder through a pipe 39 to 42 and a non-return valve 37 in the wall of each cylinder, the valve may comprise a long, generally-cylindrical housing extending at right angles to the longitudinal axes of the cylinders and mounted directly on or integral with the cylinder block. The housing has ports therein each communicating with the interior of the relevant engine cylinder and contains a rotatable cylindrical valve member having an inlet port such as 43 in FIG. 5 leading from the compressor 35 and cooler 36 and having delivery ports communicating through a passage within the valve member with the port 43 and arranged on turning of the valve member to communicate in turn with the ports in the valve housing leading to the interior of the cylinders. The valve member is driven at half engine speed and appropriately timed to lead the recirculated exhaust gases into the respective cylinders at the correct intervals.

What I claim as my invention and desire to secure by Letters Patent of the United States is:

1. An internal combustion engine comprising at least one cylinder having inlet valve means arranged to close after bottom dead center during the induction stroke of the engine, and exhaust valve means arranged to open well before bottom dead center during the power stroke of the engine, also including additional valve means through which part of the gaseous products of combustion are removable, before they have passed through the exhaust system of the engine, said additional valve means being openable during the power stroke of the engine before said exhaust valve means opens whereby gaseous products of combustion extracted through the additional valve means will have a pressure substantially greater than atmospheric pressure, and means for re-introducing the gaseous products of combustion extracted through the additional valve means into the cylinder at a pressure substantially greater than atmospheric pressure after closure of the inlet valve means thereof whereby a lower combustion temperature will be obtained thereby reducing the quantity of oxides of nitrogen in the gaseous products of combustion.

2. An engine as claimed in claim 1 in which said cylinder includes said additional valve means, the latter being opened during part of the time the exhaust valve means of the relevant cylinder is open, whereby part of the gaseous products of combustion will be removed from the cylinder for re-introduction into the cylinder instead of passing through the exhaust system of the engine.

3. An engine as claimed in claim 1 in which said cylinder is associated with a receiver chamber for the part of the gaseous products of combustion removed through the additional valve means, the latter also controlling the introduction of said part of the gaseous products into and out of the relevant receiver chamber.

4. An engine as claimed in claim 3 in which said receiver chamber is formed in the head of the relevant cylinder.

5. An engine as claimed in claim 1 and having a single cylinder in which the additional valve means comprises a branch duct leading from the exhaust system of the engine downstream of the exhaust valve means of the cylinder to the cylinder a non-return valve in said branch duct, permitting flow only in the direction from the exhaust system to the cylinder and a compressor for increasing the pressure of the exhaust gases diverted through the branch duct.

6. An engine as claimed in claim 1 and having at least two cylinders in which said additional valve means and said means for re-introducing the extracted gaseous products of combustion comprise a branch duct common to all cylinders of the engine and leading from the exhaust system of the engine downstream of the exhaust valve means in said cylinders, a distributing valve connected to the downstream end of said branch duct, a plurality of distributing ducts from said distributing valve to each said cylinder, non-return valve in each distributing duct, permitting flow only in the direction from the exhaust system to the cylinder, to each cylinder in turn in timed relationship to the opening and closing of the inlet valve means of that cylinder, and a compressor in said branch duct upstream of said distributing valve for increasing the pressure of the exhaust gases diverted through said branch duct.

7. An engine as claimed in claim 1 in which said additional valve means comprises a poppet valve and a cam-shaft for opening and closing said poppet valve.

8. An engine as claimed in claim 7 having a cam-shaft for controlling the opening and closing of inlet and exhaust valves of the engine in which the latter cam-shaft is also employed to open and close the poppet valve comprising said additional valve means.

9. An internal combustion engine comprising at least one cylinder having inlet and exhaust valve means also including additional valve means through which part of the gaseous products of combustion are removable, before they have passed through the exhaust system of the engine, and means for reintroducing the gaseous products of combustion extracted through the additional valve means into the cylinder after closure of the inlet valve means thereof, a branch duct leading from the exhaust system of the engine downstream of the exhaust valve means of the cylinder to the cylinder, a non-return valve in said branch duct, permitting flow only in the direction from the exhaust system to the cylinder and a compressor for increasing the pressure of the exhaust gases diverted through the branch duct.

10. An internal combustion engine comprising at least two cylinders having inlet and exhaust valve means also including additional valve means through which part of the gaseous products of combustion are removable, before they have passed through the exhaust system of the engine, and means for re-introducing the gaseous products of combustion extracted through the additional valve means into the cylinder after closure of the inlet valve means thereof, said additional valve means and said means for re-introducing the extracted gaseous products of combustion comprising a branch duct common to all cylinders of the engine and leading from the exhaust system of the engine downstream of the exhaust valve means in said cylinders, a distributing valve connected to the downstream end of said branch duct, a plurality of distributing ducts from said distributing valve to each said cylinder, non-return valve in each distributing duct, permitting flow only in the direction from the exhaust system to the cylinder, to each cylinder in turn in timed relationship to the opening and closing of the inlet valve means of that cylinder, and a compressor in said branch duct upstream of said distributing valve for increasing the pressure of the exhaust gases diverted through said branch duct.

* * * * *